May 12, 1925.
F. THARALDSEN
DEVICE FOR PLUGGING SMELTING FURNACES
Filed May 29, 1923
1,537,901
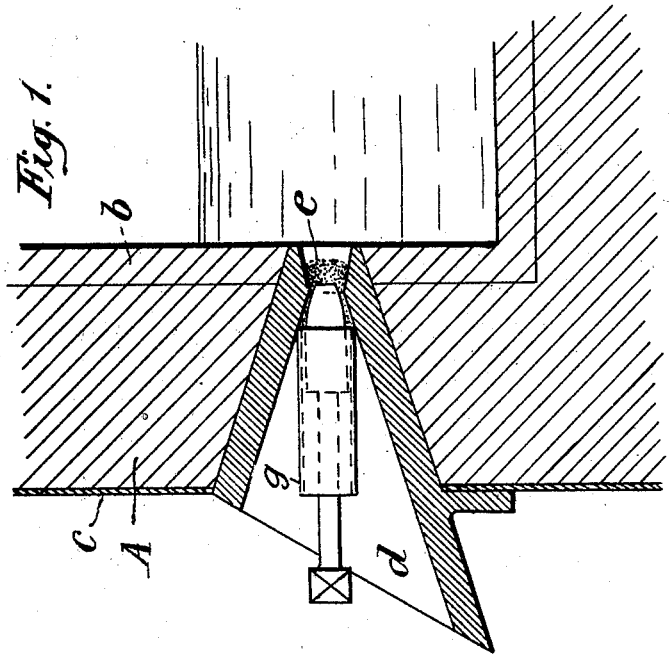
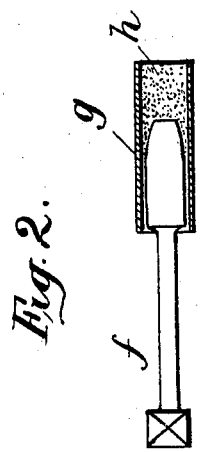
Inventor
Filip Tharaldsen
by Henry Orth Patented May 12, 1925.

1,537,901

UNITED STATES PATENT OFFICE.

FILIP THARALDSEN, OF BESTUM, NEAR CHRISTIANIA, NORWAY.

DEVICE FOR PLUGGING SMELTING FURNACES.

Application filed May 29, 1923. Serial No. 642,320.

*To all whom it may concern:*

Be it known that I, FILIP THARALDSEN, a citizen of Norway, and residing at Bestum, near Christiania, Norway, have invented certain new and useful Improvements in Devices for Plugging Smelting Furnaces, of which the following is a specification.

When plugs are used for stopping up the tap-hole it is necessary to introduce some plastic sealing material around the plug in order to make the latter fit the tap-hole exactly.

It is difficult to properly introduce the plastic material so that an efficient seal is obtained, as the plastic material will very easily be left at the edge of the hole.

The present invention has for its object to secure an easy and reliable introduction of the sealing plug and plastic material into the tap-hole, so that a safe closing of the hole is insured. To this purpose I surround the plug with a tube containing the plastic sealing material.

When tapping has been done, and the tap-hole is to be closed, the plug together with the surrounding tube is conveyed into the lip of the tap-hole towards the hole proper. When the tube strikes the outward end of the hole, the plug is pushed forward through the tube and conveys the plastic material into the hole at the same time as the plug itself enters the latter. In this way the tap-hole is completely closed, because the plug which remains in the hole will cover itself with the sealing material in passing into the hole.

In order to have the hole quickly closed the plug and the surrounding tube are most conveniently placed beforehand in the exact position relative to the hole, so that one single manipulation only is required to push the plug in at exactly the proper spot.

The invention is illustrated in the annexed drawing, in which Figure 1 is a sectional view showing the introduction of the plug and plastic material into the tap hole;

Fig. 2 is a partial sectional view of the device filled with the plastic sealing material preparatory to being inserted.

A designates the furnace wall with its lining *b* and iron shell *c*. *d* the lip of the tap-hole, and *e* its inner opening.

The particulars will be seen from Fig. 2, in which *f* the plug, *g* the tube surrounding it, and *h* the plastic sealing material contained in the tube. When the plug is pushed forward, it carries with it the tube *g*, until the latter strikes the wall of the lip and is stopped. Then the plug alone will advance and press the sealing material into the hole, thus filling any irregularities on the circumference of the hole with plastic material. The cylinder *g* is then withdrawn from the lip *d* of the tap hole leaving the plug embedded in the plastic material in the tap hole.

I claim:

1. The method of sealing tap holes of smelting and like furnaces which comprises embedding a rigid core in a plastic material and introducing the core and plastic material simultaneously into a tap hole.

2. A seal for tap holes of smelting and like furnaces consisting of a rigid plug embedded in plastic material and adapted to be introduced into the holes.

3. A seal for tap holes of smelting and like furnaces consisting of a rigid plug having a tapered end embedded in plastic material and adapted to be introduced into the holes.

4. A device for sealing tap holes of smelting and like furnaces, comprising a cylinder, a plug within the cylinder and adapted to enter a tap hole, a plastic sealing material contained in the cylinder, and means on the plug whereby the latter with the plastic material are simultaneously introduced into a tap hole.

5. A device for sealing tap holes of smelting and like furnaces, comprising a cylinder, a plug within the latter having a tapering end portion of smaller diameter than the diameter of the tap hole to be sealed, a plastic sealing material in the cylinder in front of and surrounding said tapered end portion of the plug, and a rear extension on the plug for moving the latter in the cylinder and adapted to permit the withdrawal of the cylinder over the extension.

In witness whereof I affix my signature.

FILIP THARALDSEN.